(12) United States Patent
Chidella et al.

(10) Patent No.: US 10,147,111 B2
(45) Date of Patent: Dec. 4, 2018

(54) SYSTEM AND METHOD FOR TRANSACTION ACCOUNT OWNER ACQUISITION

(71) Applicant: American Express Travel Related Services Company, Inc., New York, NY (US)

(72) Inventors: Raghavendra V. Chidella, Phoenix, AZ (US); Hans-Jurgen Greiner, Desert Hills, AZ (US); Mallikarj U. Hiremath, Scottsdale, AZ (US); Padmaja Kodavanti, Phoenix, AZ (US); Gopinath Kondapally, Phoenix, AZ (US); Simon R. Mableson, Phoenix, AZ (US); Kevin H. Ringger, Suprise, AZ (US); Kongaraveera Venkata Satya Srinivasu, Phoenix, AZ (US); Ganeshbabu Subramanian, Glendale, AZ (US); Arun Swamy, Aurora, IL (US); Subha Vanavamalai, Phoenix, AZ (US); Undra Viverette, Phoenix, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

(21) Appl. No.: 14/465,674

(22) Filed: Aug. 21, 2014

(65) Prior Publication Data

US 2016/0055511 A1  Feb. 25, 2016

(51) Int. Cl.
*G06Q 30/02* (2012.01)

(52) U.S. Cl.
CPC ..... *G06Q 30/0214* (2013.01); *G06Q 30/0215* (2013.01)

(58) Field of Classification Search
CPC .............. G06Q 30/0214; G06Q 30/02; G06Q 30/0201; G06Q 30/0203; G06Q 30/0239;
(Continued)

(56) References Cited

U.S. PATENT DOCUMENTS 7,356,503 B1    4/2008  Johnson et al.
7,774,229 B1*   8/2010  Dernehl et al. ............ 705/14.16
(Continued)

OTHER PUBLICATIONS

Office Action dated Jul. 2, 2015 in U.S. Appl. No. 14/465,687.
(Continued)

*Primary Examiner* — Thien M Le
*Assistant Examiner* — Tae Kim
(74) *Attorney, Agent, or Firm* — Snell & Wilmer L.L.P.

(57) ABSTRACT

The systems, methods, and computer readable mediums described herein provide a secure method for a transaction account issuer to issue a digital pass to an existing transaction account holder (e.g., an existing user) that may be shared and/or provided to a prospective transaction account holder (e.g., a new user). The digital pass may be sharable from an existing user's user device to a new user's user device. The systems, methods, and computer readable mediums described herein may also employ an adaptive web design solution to increase application completion rates by capturing minimal viable information from a prospective member.

20 Claims, 4 Drawing Sheets

(58) Field of Classification Search
CPC ........... G06Q 30/0241; G06Q 30/0601; G06Q 30/0633; G06Q 50/01
USPC ........................................................ 235/380
See application file for complete search history.

(56) References Cited

U.S. PATENT DOCUMENTS

| | | |
|---|---|---|
| 2003/0126015 A1* | 7/2003 | Chan et al. ..................... 705/14 |
| 2007/0145120 A1 | 6/2007 | Webb |
| 2008/0033813 A1* | 2/2008 | Khachatryan ................... 705/14 |
| 2009/0083135 A1 | 3/2009 | Lutnick |
| 2011/0184790 A1* | 7/2011 | Deol Brar .......... G06Q 30/0241 705/14.4 |
| 2012/0101881 A1* | 4/2012 | Taylor .................... G06Q 20/12 705/14.13 |
| 2013/0191261 A1 | 7/2013 | Chandler et al. |
| 2014/0070001 A1 | 3/2014 | Sanchez |
| 2014/0180906 A1 | 6/2014 | Paisley |

OTHER PUBLICATIONS

Advisory Action dated Apr. 8, 2016 in U.S. Appl. No. 14/465,687.
Final Office Action dated Jan. 5, 2016 in U.S. Appl. No. 14/465,687.
Office Action dated Oct. 20, 2016 in U.S. Appl. No. 14/465,687.
Office Action dated Jan. 26, 2017 in U.S. Appl. No. 14/465,687.
Final Office Action dated Jul. 27, 2017 in U.S. Appl. No. 14/465,687.
Advisory Action dated Sep. 21, 2017 in U.S. Appl. No. 14/465,687.
Office Action dated Dec. 15, 2017 in U.S. Appl. No. 14/465,687.
USPTO; Notice of Allowance dated May 16, 2018 in U.S. Appl. No. 14/465,687.

* cited by examiner

SYSTEM AND METHOD FOR TRANSACTION ACCOUNT OWNER ACQUISITION

FIELD

The present disclosure relates to systems and methods for transaction account acquisition, and more specifically, to creating referral opportunities for existing transaction account users and streamlining the application process for prospective transaction account users.

BACKGROUND

Member acquisition models typically leverage existing members providing potential new members with transaction accounts or other identifying information that allows a existing member to be identified by a transaction account issuer as a referral source to a potential new member. However, these traditional member acquisition methods typically require that the existing member have on hand a transaction account that the existing member is willing to provide the potential new member. This may lead to the potential new member failing to apply and/or having to retain the existing member's information until an application is provided to a transaction account issuer.

The application process may also be cumbersome. In this regard, the application process may require that a potential new member provide extensive personally identifying information, along with the existing member's referral identifier (e.g., an account number). As such, methods for acquiring new members and for streamlining the application process for new members may provide a more efficient new member acquisition scheme.

SUMMARY

The system may be configured for generating a digital pass for an existing transaction account user. The system may further be configured to perform operations comprising transmitting the digital pass to the transaction account user. The digital pass may be a sharable electronic pass including a selectable link and/or a scanable indicator. The system may further be configured to receive an application from a prospective transaction account user for a transaction account. The application may include at least one of digital pass information or prospective transaction account user information. The system may further be configured to provide a first reward to the prospective transaction account user in response to receiving at least one of the application, a selection of an offer of a reward, or a selection of the digital pass. The first reward may be provided in substantially real-time.

In various embodiments, the system may further be configured to provide a second reward to the transaction account user. The system may further present, to the transaction account user via a micro-application on a first user device, a selectable request to generate the digital pass. The digital pass may be created and linked to the transaction account user.

In various embodiments, the digital pass may be sharable from a first user device associated with the transaction account user to a second user device associated with the prospective transaction account user. More specifically, the digital pass may also be transmitted from a first micro-application on the first user device to a second micro-application on the second user device. The digital pass may also be displayed in a first micro-application on the first user device and may be scanned by the second user device.

In various embodiments, the system may receive, via a second user device associated with a prospective transaction account user, a selection of the pass from the prospective transaction account user. The system may transmit the offer of reward to the second user device with a request to complete an application for the transaction account. The system may further generate instructions to issue the transaction account in response to the application satisfying an application standard. The system may generate instructions to deny the application in response to the application failing to satisfy an application standard.

A system for issuing transaction accounts is also provided. The system may be configured for transmitting, a request for preliminary information to a user device. The request may be transmitted in response to an inquiry from a user regarding the user's eligibility for the transaction account. The system may be configured for receiving a response from the user. The system may be configured for parsing the response into application information. The system may be configured for creating an identity verification request based on the application information to create identity verification information. The system may be configured for transmitting the identity verification information to a credit rating agency. The credit rating agency may be capable of providing personally identifying information and creditworthiness information to complete a credit application and to supplement the application information for the user. The system may be configured for determining that the credit application complies with a transaction account issuing threshold. The system may be configured for issuing instructions to issue a transaction account to the user in response to the credit application at least partially satisfying the transaction account issuing threshold.

In various embodiments, the creditworthiness information may include a credit score. The user device may be a portable electronic device that has received a digital pass from a transaction account holder. The digital pass may be created by the transaction account holder and shared from a transaction account holder device to a user device by the transaction account holder. The system may be operated by a transaction account issuer that is affiliated with the credit rating agency. The transaction account issuer may be provided with debt, asset and income information from the credit rating agency, in response to the identity verification information. The user device may be configured to present a digital request for information including a request for six distinct pieces of user information to create the identity verification information.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
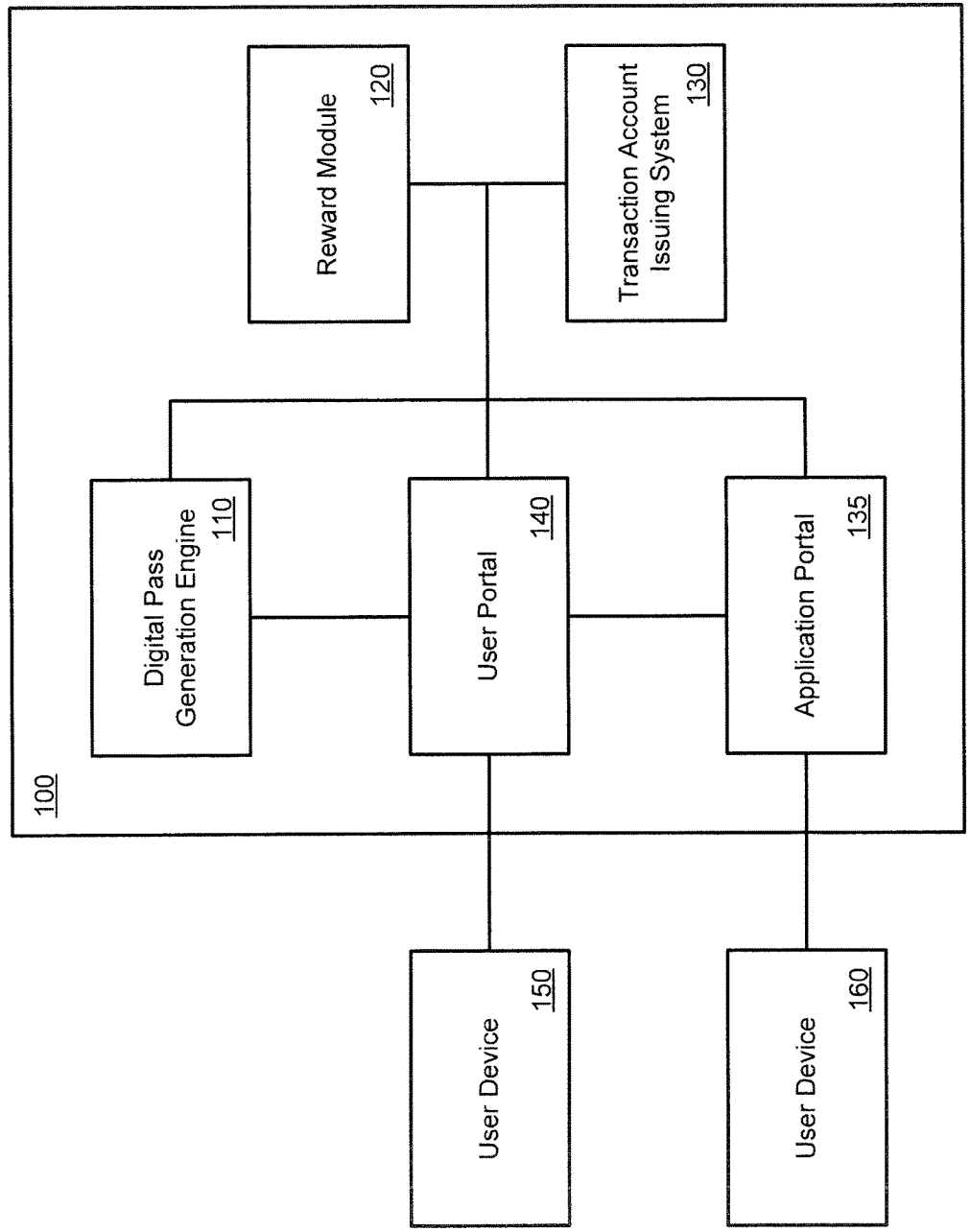
FIG. 1 illustrates a system architecture for a transaction account acquisition system, in accordance with various embodiments.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the systems, methods, and computer readable mediums (collectively, the "systems") described herein provide a secure method for a transaction account issuer to issue a digital pass to an existing transaction account holder (e.g., an existing user) that may be shared and/or provided to a prospective transaction account holder (e.g., a new user). In this regard, the systems described herein may allow for an existing user to refer and/or acquire a new user on behalf of the transaction account issuer by sharing a digital pass. The digital pass may be sharable from an existing user's user device to a new user's user device. For example, if the existing user is operating an iPhone® with Passbook® and the new user is operating an iPhone® with Passbook®, the digital pass may be sharable between the existing user's device and the new user's device via Passbook. Passbook, also now known as Apple Wallet, is a mobile app included in the smartphone operating system that stores digital passes. The digital pass may include a 1D or 2D bar code. Passes may be distributed via Air Drop, online via a web browser, via email, SMS, MMS, social media, an app, or scanned using, for example, a built-in scanner in the wallet. A location can be added to each pass, such that the pass may be triggered by location. The pass may also be triggered by a time of day. Passes are created as a package. The package is a pass template, that is created with a pass signer, along with relevant data and a private key. Passes can be updated at any time using an API and an app can interact directly with passes stored in a wallet.

In various embodiments, the systems may also employ an adaptive web design solution to increase application completion rates by capturing minimal viable information from a prospective member. In this regard, the application may request and/or require the prospective member to provide minimal personally identifying information ("PII"). This minimal and/or initial PII may be provided to a credit issuing organization that may be configured to and/or capable of providing additional information to complete a credit application.

In various embodiments and with reference to FIG. 1, a transaction account system 100 may comprise a digital pass generation engine 110, a reward module 120, a transaction account issuing system 130, a user portal 140, and an application portal 135. Transaction account system 100 may also be assessable by a first user device 150 and/or a second user device 160. Each of the modules, engines, systems and/or portals of transaction account system 100 may be in electronic communication with one another. Moreover, each of these engines, modules, systems and/or portals may be configured to share electronic information and/or connect one or more users and/or credit issuing agencies to one another.

Figure 2A:
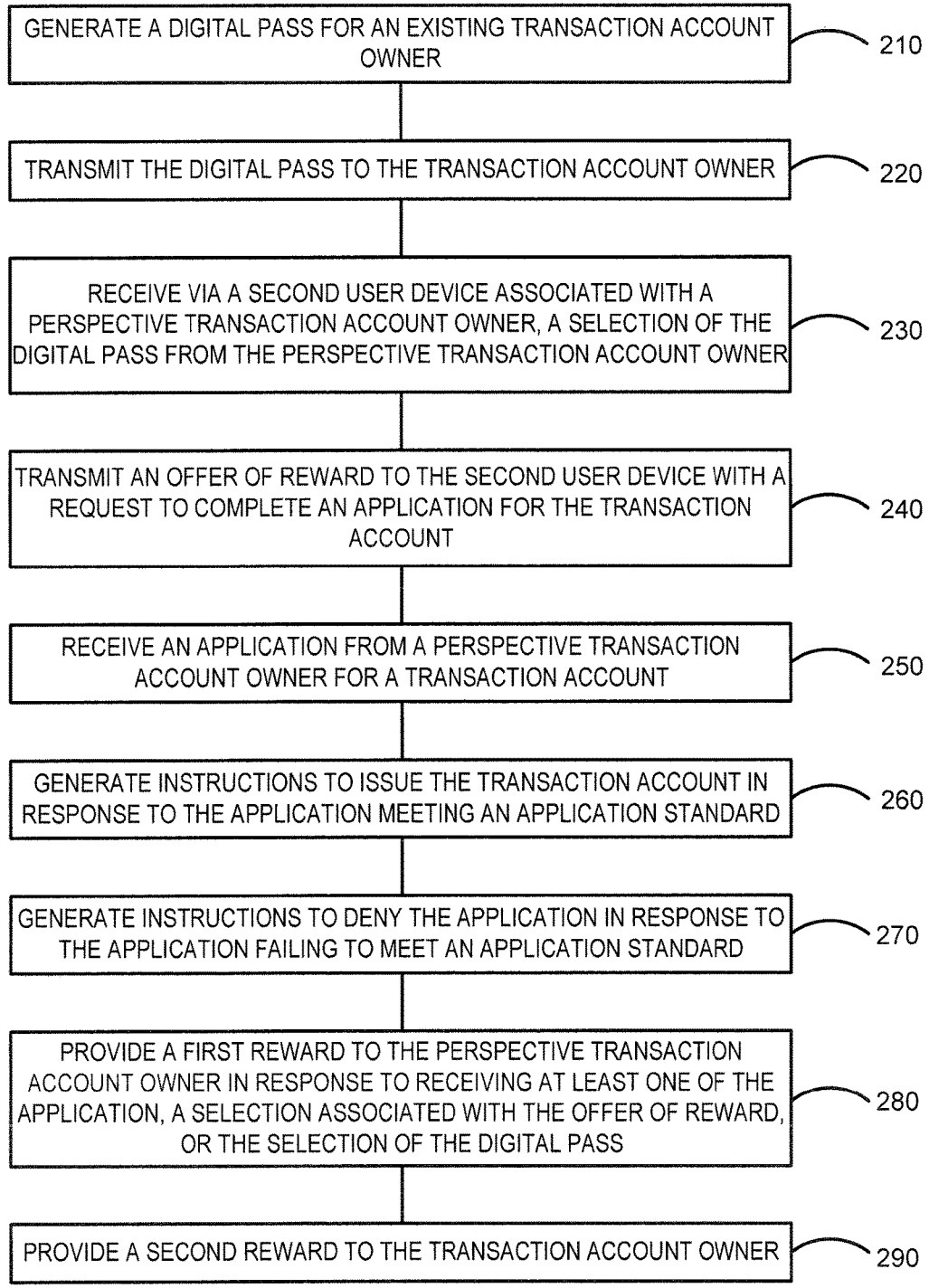
FIG. 2A is a process flow for a user referral for transaction account acquisition, in accordance with various embodiments.
Figure 2B:
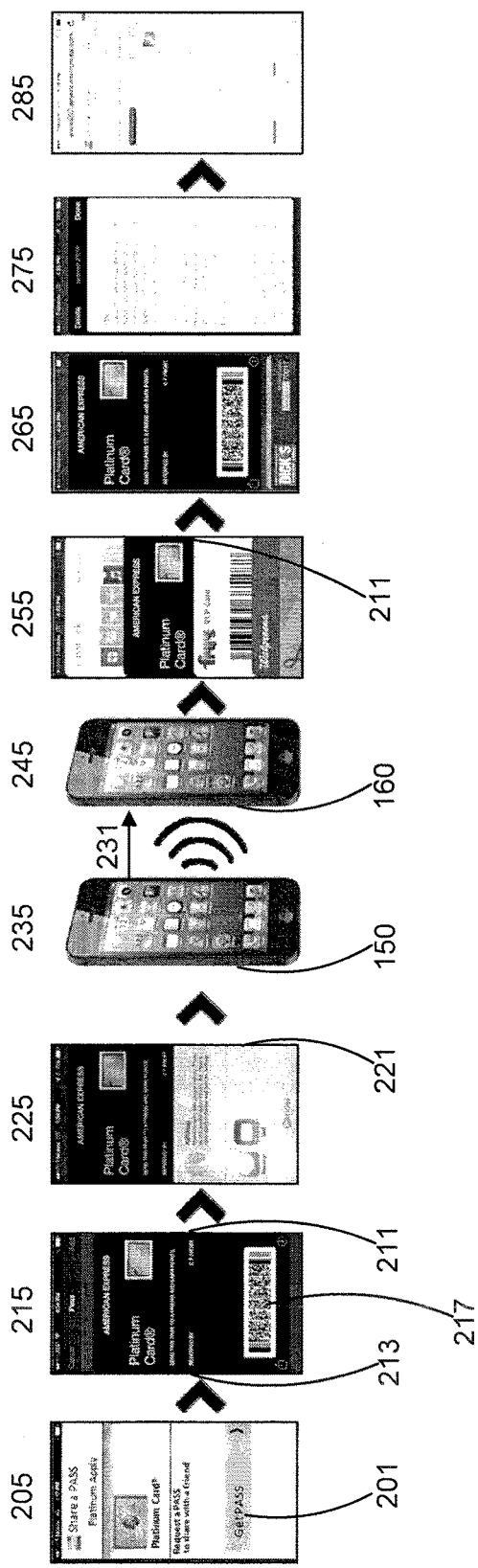
FIG. 2B illustrates the process flow of a user referral for transaction account acquisition, in accordance with various embodiments.

In various embodiments, and with reference to FIG. 1 and FIGS. 2A-2B, transaction account system 100 may be configured to generate a digital pass for an existing transaction account owner (Step 210). Transaction account system 100 may be configured to receive a request to generate the digital pass from an existing transaction account owner. In this regard, the existing transaction account owner may log into the transaction account system 100 as shown in screen 205. From there, the existing transaction account owner may select a get digital pass option 201 presented by transaction account system 100 via user portal 140. The request from the existing transaction account owner may cause transaction account system 100 to generate the digital pass. Transaction account system 100 may further provide and/or transmit the digital pass to the existing transaction account owner (Step 220). Transaction account system 100 may transmit the digital pass through user portal 140 to first user device 150. First user device 150 may be a user device associated with the existing transaction account owner.

In various embodiments, digital pass 211, as shown in screen 215, may include a selectable portion 215. Digital pass 211 may also include a scanable portion 217. Selectable portion 215 may include a link to a landing page, a link to an application, may trigger a request for application information (e.g., a request for preliminary application information) and/or the like. Similarly, scanable portion 217 may route a user to a landing page, an application, and/or the like. Moreover, digital pass 211 may be presented by a existing user to a new user via first user device 150. The new user may capture scanable portion 217 via second user device 160.

In various embodiments, the digital pass provided to the existing transaction account owner may be sharable via first user device 150 and shown in screen 225. In this regard, first user device 150 may be equipped with a digital wallet (e.g., Passbook®) that is configured to store and share the digital pass. The existing transaction account owner may share the digital pass via first user device 150, as shown in screen 235, to a prospective transaction account owner via the prospective transaction account owner's second user device 160, as shown in screen 245, by a communication protocol 231. This communication may happen via any suitable electronic communication protocol 231 including, for example, an air drop, a text and/or SMS message, a Bluetooth low energy communication, an NFC communication, a wireless communication, and/or any other suitable communication. Air Drop enables the wireless transfer of files between mobile devices. To operate Air drop, the system uses a peer-to-peer Wi-Fi connection for transferring files, wherein Wi-Fi is turned on both the sending and receiving device in order for Air Drop to recognize the other device, wherein the devices communicate directly without using an internet connection or a Wi-Fi access point. The receiving device must accept the transfer to improve security and privacy. Digital pass 211 may be stored in the digital wallet and/or passbook of second user device 160, as shown in screen 255. Moreover, digital pass 211 may be selectable and or accessible by the new user via second user device 160, as shown in screen 265, and may be configured to present the new user with terms for applying for a transaction account, as shown in screen 275.

In various embodiments, and in response to the prospective user receiving the digital pass via the second user device 160, transaction account system 100 may receive, via second user device 160, a selection of the digital pass from the prospective transaction account owner (Step 230). Transaction account system 100 may be configured to request application information from the new user via second user device 160, as shown in screen 285. This communication may be secured by via application portal 135. In response to receiving a selection of the digital pass from the prospective transaction account owner via the second user device 160, transaction account system 100 may transmit an offer for a reward to the second user device 160 with a request to complete an application for a transaction account (Step 240). Transaction account system 100 may be configured to provide any suitable reward including, for example, points, a credit that has a monetary value, an experience, access to an item, and/or the like.

In various embodiments, transaction account system 100 may receive an application from a prospective transaction account owner for a transaction account (Step 250). The application may comprise digital pass information and/or transaction account owner information. In this regard, the digital pass information and/or transaction account owner information may particularly identify a referring existing transaction account owner. The application from the prospective transaction account owner may be analyzed by transaction account issuing system 130. Transaction account issuing system 130 may comprise a standard and/or series of factors that the application submitted by a prospective transaction account owner is evaluated against.

In various embodiments, transaction account system 100, and more specifically transaction account issuing system 130, may generate instructions to issue a transaction account in response to the application satisfying an application standard (Step 260). Transaction account system 100 and/or transaction account issuing system 130 may also generate instructions to deny the application in response to the application failing to satisfy an application standard (Step 270). The application standard may comprise any suitable standard. For example, the application standard may comprise a defined income level, a debt threshold, an asset threshold, a debt to asset ratio, a debt to income threshold and/or ratio, and/or the like. Moreover, the application standard may be based on a credit agency score, a default risk, and/or the like.

In various embodiments, transaction account system 100 and/or reward module 120 may be configured to provide a first reward to the prospective transaction account owner in response to receiving an application and/or a selection of the digital pass in substantially real time (Step 280). In this regard, transaction account system 100 and/or reward module 120 may be configured to issue a reward to the prospective transaction account owner via second user device 160 in response to the prospective transaction account owner selecting the digital pass, receiving the digital pass, submitting an application for a transaction account, and/or the like.

Moreover, transaction account system 100 and/or reward module 120 may be configured to provide a second reward to the existing transaction account owner (Step 290). The existing transaction account owner may receive the reward based on sharing the digital pass and/or referring the prospective transaction account owner to transaction account system 100 and/or transaction account issuing system 130.

In various embodiments, the digital pass may be a sharable digital element that is exchangeable between micro applications associated with first user device 150 and second user device 160. The micro application associated with first user device 150 may be configured to share the digital pass with a micro application associated with the second user device 160. The digital pass may comprise a selectable element that when selected by the prospective transaction account owner allows the prospective transaction account owner to apply for a transaction account. Moreover, the digital pass may present a scannable element that when scanned by the prospective transaction account owner's second user device 160 allows the prospective transaction account owner to apply for a transaction account via transaction account system 100 and/or transaction account issuing system 130.

Figure 3:
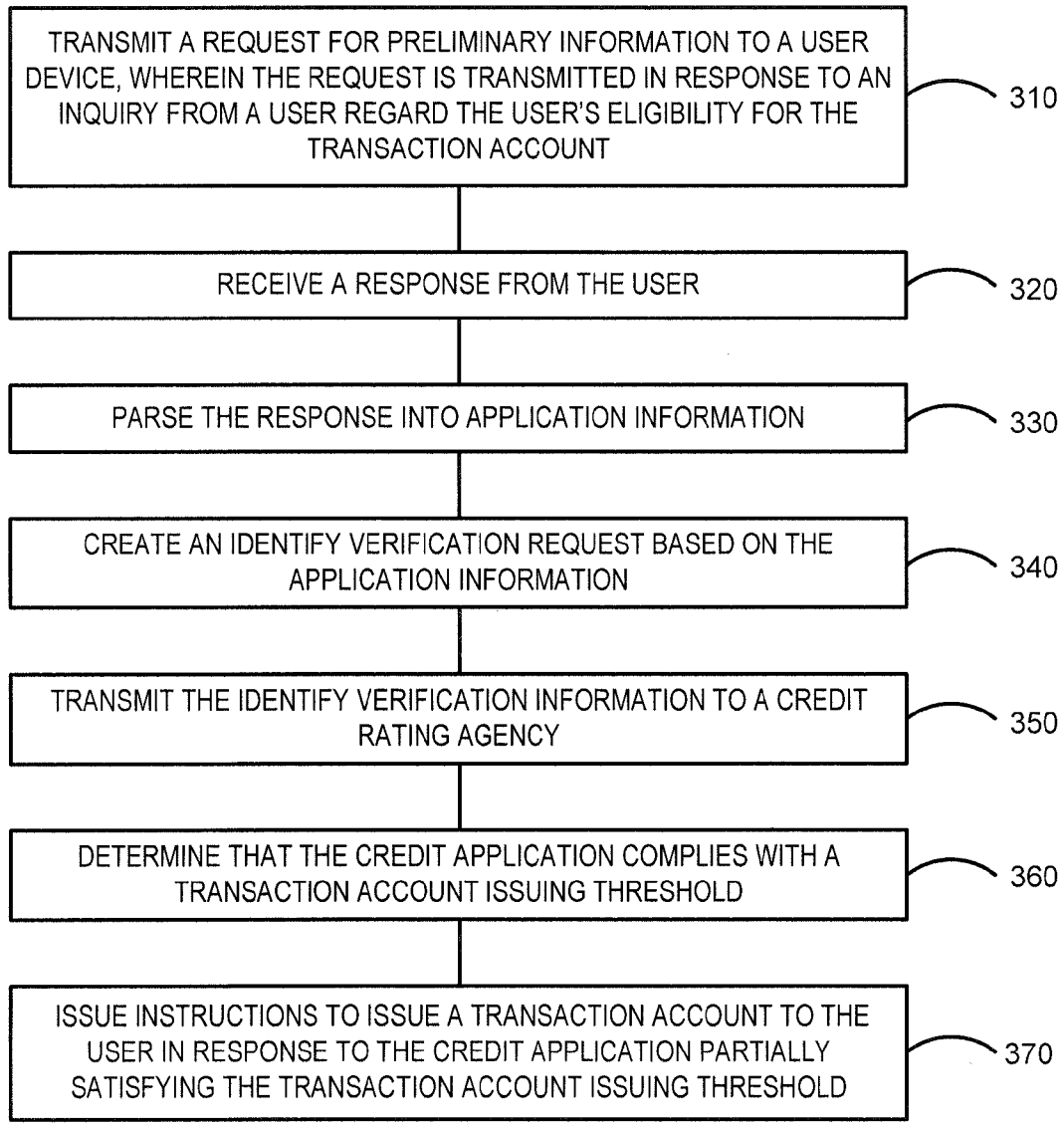
FIG. 3 is a process flow for a credit application completion process, in accordance with various embodiments.

In various embodiments, and with reference to FIGS. 1 and 3, in response to a selection of a digital pass and/or an inquiry to apply for a transaction account, transaction account system 100 and/or transaction account issuing system 130 may transmit a request for preliminary information to second user device 160 (Step 310), as shown in screen 285 of FIG. 2B. The request may be transmitted in response to an inquiry from a prospective transaction account owner regarding the prospective transaction account owner's eligibility for a transaction account. Transaction account system 100 and/or transaction account issuing system 130 may receive a response from the prospective transaction account owner (Step 320). The response may comprise the preliminary information requested by transaction account system 100 and/or transaction account issuing system 130.

In various embodiments, transaction account system 100 and/or transaction account issuing system 130 may parse the response into application information (Step 330). The preliminary information may include six elements of PII provided by the prospective user via second user device 160. The PII may include standard requests for information that a credit bearu may otherwise seek for a credit card application. This PII may include, for example, personal and business information. Transaction account system 100 and/or transaction account issuing system 130 may be configured to create an identity verification request based on the application information (Step 340). Transaction account system 100 and/or transaction account issuing system 130 may be operated by a transaction account issuer. Moreover, the transaction account issuer may have a relationship with a credit rating agency. In this regard, the transaction account issuer may be affiliated with and/or may have a relationship such that information is exchanged between the transaction account issuer and the credit rating agency. This information may include, for example, debt information, asset information, income information, credit rating agency scores, default risk scores, and/or the like. Moreover, the credit rating agency may be capable of providing the transaction account issuer with a ratio, score, and/or rating of the likelihood of payment and/or default to the transaction account issuer. Any of this information may be used and/or evaluated against an application standard and/or a set of issuing rules for issuance of a transaction account by transaction account system 100 and/or transaction account issuing system 130.

In various embodiments, transaction account system 100 and/or transaction account issuing system 130 may be configured to determine that the credit application complies with and/or satisfies a transaction account issuing threshold (Step 360). The credit application may be based on PII and/or creditworthiness information provided by the credit rating agency. In response to the credit application satisfying the account issuing threshold, transaction account system 100 and/or transaction account issuing system 130 may issue instructions to issue a transaction account to the prospective user (Step 370).

In various embodiments, the prospective user device may be any suitable portable electronic device that has received a digital pass from an existing transaction account holder. In this regard, the digital pass may be created by transaction account system 100 and/or transaction account issuing system 130 based on a request from an existing transaction account holder. Moreover, this digital pass may be shared by the transaction account holder via a first user device 150 to a prospective transaction account owner's second user device 160.

The phrases consumer, customer, user, account holder, account affiliate, cardmember or the like shall include any person, entity, business, government organization, business, software, hardware, machine associated with a transaction account, that buys merchant offerings offered by one or more merchants using the account and/or that is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a biometric, and the like.

The system may include or interface with any of the foregoing accounts, devices, and/or a transponder and reader in BLE communication with the transponder (which may include a fob), or communications between an initiator and a target enabled by short range communications protocols. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Androids Operating System, Apple® iOS, a Blackberry® operating system and the like. The micro-application may be configured to leverage the resources of the larger operating system and associated hardware via a set of predetermined rules which govern the operations of various operating systems and hardware resources. For example, where a micro-application desires to communicate with a device or network other than the mobile device or mobile operating system, the micro-application may leverage the communication protocol of the operating system and associated device hardware under the predetermined rules of the mobile operating system. Moreover, where the micro-application desires an input from a user, the micro-application may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   generating, by a computer based system, a digital pass for a transaction account user,
   wherein the digital pass enables verifications and enables transactions,
   wherein the digital pass includes a pass template that is created with a pass signer and a private key,
   wherein the digital pass is updated using an application programming interface (API),
   wherein the digital pass is stored and managed in a digital wallet, and
   wherein the digital pass is a sharable electronic pass with at least one of a selectable link or a scan-able indicator;
   incorporating, by the computer based system and in response to the generating the digital pass, an identification of the transaction account user into the digital pass;
   transmitting, by the computer based system and via a portal, the digital pass to a digital wallet of a first device of the transaction account user,
   wherein the digital pass is a sharable electronic pass managed by the digital wallet,
   wherein the first device establishes a wireless communication link to a second device associated with an applicant, and
   wherein the first device wirelessly transfers the digital pass to the second device via the wireless communication link and using a wireless communication protocol;
   generating, by the computer based system, a request to complete a transaction account application, in response to at least one of a selection of the selectable link or a scanning of the scan-able indictor of the digital pass by the applicant,
   wherein the transaction account application is associated with the digital pass;
   transmitting, by the computer based system and in response to the generating the request, the request to complete the application to the applicant;
   receiving, by the computer based system and in response to the transmitting the request, the transaction account application from the applicant for a transaction account,
      wherein the transaction account application includes preliminary information about the applicant,
      wherein the preliminary information includes a subset of personally identifying information about the applicant,
      wherein the transaction account application is populated with the identification of the transaction account user via at least one of digital pass information or transaction account user information,
      wherein the transaction account application qualifies the applicant to receive the transaction account,
      wherein the transaction account is used to conduct a financial transaction for purchasing items from merchants, and
      wherein the purchasing with the transaction account results in records of charges with the merchants and settlements of the records of charges with a financial institution that issued the transaction account;
   creating, by the computer based system and in response to receiving the preliminary information, an identity verification request based on the preliminary information to create identity verification information;
   transmitting, by the computer based system and in response to creating the identity verification request, the identity verification information to a credit rating agency;
   receiving, by the computer based system and from the credit rating agency, creditworthiness information to complete the transaction account application and to supplement the transaction account application information for the applicant;

analyzing, by the computer based system and in response to the receiving the credit worthiness information, the transaction account application, based on the preliminary information provided by the applicant, and the credit worthiness information provided by the credit rating agency;

determining, by the computer based system, that the transaction account application at least partially satisfies a transaction account issuing threshold;

issuing, by the computer based system, the transaction account to the applicant, in response to the transaction account application at least partially satisfying the transaction account issuing threshold;

receiving, by the computer based system, an authorization request from the merchant to authorize the purchasing using the transaction account; and receiving, by the computer based system, a settlement request from the merchant associated with the purchasing.

2. The method of claim 1, further comprising providing, by the computer based system, a reward to the transaction account user.

3. The method of claim 2, wherein the digital pass is sharable from a first user device associated with the transaction account user to a second user device associated with the applicant.

4. The method of claim 3, wherein the digital pass is transmitted from a first micro-application on the first user device to a second micro-application on the second user device.

5. The method of claim 4, wherein the digital pass is displayed in the first micro-application on the first user device and is scanned by the second user device.

6. The method of claim 5, further comprising:
transmitting, by the computer based system, an offer of the reward to a second user device with a request to complete the transaction account application for the transaction account; and
providing, by the computer based system, the reward to the applicant in response to receiving at least one of the transaction account application, a selection of the offer of the reward, the scanning of the scan-able indictor of the digital pass or the selection of the selectable link of the digital pass,
wherein the reward is provided in substantially real-time.

7. The method of claim 6, further comprising presenting, by the computer based system and to the transaction account user via the first micro-application on the first user device, a selectable request to generate the digital pass, wherein the digital pass is created and linked to the transaction account user.

8. The method of claim 1, wherein the wireless communication protocol includes the use of at least one of a web browser, email, short message service (SMS), multimedia messaging service (MMS), social media, an app, or scanned data.

9. The method of claim 1, wherein the wireless communication protocol includes a peer-to-peer wireless local area networking (Wi-Fi) connection for transferring files, wherein the first device and the second device activate the Wi-Fi connection in order for the first device to recognize the second device, wherein the first device and the second device communicate directly without using an internet connection or a Wi-Fi access point, and wherein the second device accepts the transferring files.

10. The system of claim 9, wherein the digital pass is displayed in a first micro-application on the first user device and is scanned by the second user device.

11. The method of claim 1, wherein the transaction account issuing threshold is based on at least one of a defined income level, a debt threshold, an asset threshold, a debt to asset ratio, a debt to income threshold, a credit agency score, or a default risk.

12. A system comprising:
a processor; and
a tangible, non-transitory memory configured to communicate with the processor,
the tangible, non-transitory memory having instructions stored thereon that, in response to execution by the processor, cause the processor to perform operations comprising:
generating, by the processor, a digital pass for a transaction account user,
wherein the digital pass enables verifications and enables transactions,
wherein the digital pass includes a pass template that is created with a pass signer and a private key,
wherein the digital pass is updated using an API,
wherein the digital pass is stored and managed in a digital wallet, and
wherein the digital pass is a sharable electronic pass with at least one of a selectable link or a scan-able indicator;
incorporating, by the processor and in response to the generating the digital pass, an identification of the transaction account user into the digital pass;
transmitting, by the processor and via a portal, the digital pass to a digital wallet of a first device of the transaction account user,
wherein the digital pass is a sharable electronic pass managed by the digital wallet,
wherein the first device establishes a wireless communication link to a second device associated with an applicant, and
wherein the first device wirelessly transfers the digital pass to the second device via the wireless communication link and using a wireless communication protocol;
generating, by the processor, a request to complete a transaction account application, in response to at least one of a selection of the selectable link or a scanning of the scan-able indictor of the digital pass by the applicant,
wherein the transaction account application is associated with the digital pass;
transmitting, by the processor and in response to the generating the request, the request to complete the application to the applicant;
receiving, by the processor and in response to the transmitting the request, the transaction account application from the applicant for a transaction account,
wherein the transaction account application includes preliminary information about the applicant,
wherein the preliminary information includes a subset of personally identifying information about the applicant,
wherein the transaction account application is populated with the identification of the transaction account user via at least one of digital pass information or transaction account user information, wherein the transaction account application qualifies the applicant to receive the transaction account, wherein the transaction account is used to conduct a financial transaction for purchasing items from merchants, and wherein the purchasing with the transaction account results in records of charges with the merchants and settlements of the records of charges with a financial institution that issued the transaction account;

creating, by the processor and in response to receiving the preliminary information, an identity verification request based on the preliminary information to create identity verification information;

transmitting, by the processor and in response to creating the identity verification request, the identity verification information to a credit rating agency;

receiving, by the processor and from the credit rating agency, creditworthiness information to complete the transaction account application and to supplement the transaction account application information for the applicant;

analyzing, by the processor and in response to the receiving the credit worthiness information, the transaction account application, based on the preliminary information provided by the applicant, and the credit worthiness information provided by the credit rating agency;

determining, by the processor, that the transaction account application at least partially satisfies a transaction account issuing threshold;

issuing, by the processor, the transaction account to the applicant, in response to the transaction account application at least partially satisfying the transaction account issuing threshold;

receiving, by the processor, an authorization request from the merchant to authorize the purchasing using the transaction account; and receiving, by the processor, a settlement request from the merchant associated with the purchasing.

13. The system of claim 12, further configured to perform operations comprising:

transmitting, by the processor, an offer of a reward to a second user device with a request to complete the transaction account application for the transaction account; and providing, by the processor, the reward to the applicant in response to receiving at least one of the transaction account application, a selection of the offer of the reward, or the selection of the selectable link of the digital pass, wherein the first reward is provided in substantially real-time.

14. The system of claim 12, further configured to perform operations comprising: presenting, by the processor and to the transaction account user via a micro-application on a first user device, a selectable request to generate the digital pass, wherein the digital pass is created and linked to the transaction account user.

15. An article of manufacture including a non-transitory, tangible computer readable storage medium having instructions stored thereon that, in response to execution by a computer based system, cause the computer based system to perform operations comprising:

generating, by the computer based system, a digital pass for a transaction account user, wherein the digital pass enables verifications and enables transactions, wherein the digital pass includes a pass template that is created with a pass signer and a private key, wherein the digital pass is updated using an API, wherein the digital pass is stored and managed in a digital wallet, and wherein the digital pass is a sharable electronic pass with at least one of a selectable link or a scan-able indicator;

incorporating, by the computer based system and in response to the generating the digital pass, an identification of the transaction account user into the digital pass;

transmitting, by the computer based system and via a portal, the digital pass to a digital wallet of a first device of the transaction account user, wherein the digital pass is a sharable electronic pass managed by the digital wallet, wherein the first device establishes a wireless communication link to a second device associated with an applicant, and wherein the first device wirelessly transfers the digital pass to the second device via the wireless communication link and using a wireless communication protocol;

generating, by the computer based system, a request to complete a transaction account application, in response to at least one of a selection of the selectable link or a scanning of the scan-able indictor of the digital pass by the applicant, wherein the transaction account application is associated with the digital pass;

transmitting, by the computer based system and in response to the generating the request, the request to complete the application to the applicant;

receiving, by the computer based system and in response to the transmitting the request, the transaction account application from the applicant for a transaction account, wherein the transaction account application includes preliminary information about the applicant, wherein the preliminary information includes a subset of personally identifying information about the applicant, wherein the transaction account application is populated with the identification of the transaction account user via at least one of digital pass information or transaction account user information, wherein the transaction account application qualifies the applicant to receive the transaction account, wherein the transaction account is used to conduct a financial transaction for purchasing items from merchants, and wherein the purchasing with the transaction account results in records of charges with the merchants and settlements of the records of charges with a financial institution that issued the transaction account;

creating, by the computer based system and in response to receiving the preliminary information, an identity verification request based on the preliminary information to create identity verification information;

transmitting, by the computer based system and in response to creating the identity verification request, the identity verification information to a credit rating agency;

receiving, by the computer based system and from the credit rating agency, creditworthiness information to complete the transaction account application and to supplement the transaction account application information for the applicant;

analyzing, by the computer based system and in response to the receiving the credit worthiness information, the transaction account application, based on the preliminary information provided by the applicant, and the credit worthiness information provided by the credit rating agency;

determining, by the computer based system, that the transaction account application at least partially satisfies a transaction account issuing threshold;

issuing, by the computer based system, the transaction account to the applicant, in response to the transaction account application at least partially satisfying the transaction account issuing threshold;

receiving, by the computer based system, an authorization request from the merchant to authorize the purchasing using the transaction account; and receiving, by the computer based system, a settlement request from the merchant associated with the purchasing.

16. The article of claim 15, further configured to perform operations comprising providing, by the computer based system, a reward to the transaction account user.

17. The article of claim 15, wherein the digital pass is sharable from a first user device associated with the transaction account user to a second user device associated with the applicant.

18. The article of claim 17, wherein the digital pass is transmit from a first micro-application on the first user device to a second micro-application on the second user device.

19. The article of claim 15, further configured to perform operations comprising:

transmitting, by the computer based system, an offer of a reward to a second user device with a request to complete the transaction account application for the transaction account; and providing, by the computer based system, the reward to the applicant in response to receiving at least one of the transaction account application, a selection of the offer of the reward, or the selection of the selectable link of the digital pass, wherein the first reward is provided in substantially real-time.

20. The article of claim 15, further configured to perform operations comprising: presenting, by the computer based system and to the transaction account user via a micro-application on a first user device, a selectable request to generate the digital pass, wherein the digital pass is created and linked to the transaction account user.

* * * * *